(12) United States Patent
Yoshikawa (10) Patent No.: US 8,640,532 B2
(45) Date of Patent: Feb. 4, 2014

(54) APPARATUS AND METHOD FOR DETECTING ABNORMAL AIR-FUEL RATIO VARIATION BETWEEN CYLINDERS

(71) Applicant: Yuya Yoshikawa, Chiryu (JP)

(72) Inventor: Yuya Yoshikawa, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/673,403

(22) Filed: Nov. 9, 2012

(65) Prior Publication Data

US 2013/0118245 A1    May 16, 2013

(30) Foreign Application Priority Data

Nov. 15, 2011 (JP) ................. 2011-249623

(51) Int. Cl.
*G01M 15/10* (2006.01)
(52) U.S. Cl.
USPC ........................................ 73/114.72
(58) Field of Classification Search
USPC ........................................ 73/114.72
See application file for complete search history.

(56) References Cited

U.S. PATENT DOCUMENTS

| 7,152,594 | B2 * | 12/2006 | Anilovich et al. | 123/690 |
|---|---|---|---|---|
| 7,783,408 | B2 * | 8/2010 | Teraya | 701/102 |
| 7,802,563 | B2 * | 9/2010 | Behr et al. | 123/692 |
| 8,249,794 | B2 * | 8/2012 | Miyamoto et al. | 701/103 |
| 8,381,708 | B2 * | 2/2013 | Katayama et al. | 123/703 |
| 8,505,367 | B2 * | 8/2013 | Porten et al. | 73/114.31 |
| 2009/0037079 | A1 * | 2/2009 | Suzuki et al. | 701/103 |
| 2009/0211350 | A1 * | 8/2009 | Iwazaki et al. | 73/114.72 |
| 2012/0116651 | A1 | 5/2012 | Miyamoto et al. | |

FOREIGN PATENT DOCUMENTS

WO    2011030451 A1    3/2011

* cited by examiner

*Primary Examiner* — Freddie Kirkland, III
(74) *Attorney, Agent, or Firm* — Gifford, Krass, Sprinkle, Anderson & Citkowski, P.C.

(57) ABSTRACT

An apparatus and method for detecting an abnormal air-fuel ratio variation between cylinders of a multi-cylinder internal combustion engine in which the output of an air-fuel ratio sensor is acquired at each sampling interval, a parameter correlated with the degree of fluctuation of the sensor output is calculated from a plurality of the acquired sensor outputs, and the presence or absence of the abnormal air-fuel ratio variation between cylinders is determined by comparing the parameter with a determination value. A cylinder air amount is estimated at each sampling interval. Every time the air-fuel ratio sensor output is acquired, the value of the cylinder air amount at the point earlier, by a transport delay time, than the point of the acquisition is determined based on the time-series data, and a corresponding determination value corresponding thereto is calculated. The determination value is determined based on a plurality of the calculated corresponding determination values.

13 Claims, 8 Drawing Sheets

FIG. 9

APPARATUS AND METHOD FOR DETECTING ABNORMAL AIR-FUEL RATIO VARIATION BETWEEN CYLINDERS

INCORPORATION BY REFERENCE

The disclosure of Japanese Patent Application No. 2011-249623 filed on Nov. 15, 2011 including the specification, drawings and abstract is incorporated herein by reference in its entirety.

BACKGROUND OF THE INVENTION

1. Field of the Invention

The invention relates to an apparatus for detecting an abnormal air-fuel ratio variation between cylinders of a multi-cylinder internal combustion engine, and particularly relates to an apparatus and a method for detecting a relatively large air-fuel ratio variation between cylinders of a multi-cylinder internal combustion engine.

2. Description of Related Art

In general, in an internal combustion engine provided with an exhaust gas control system using a catalyst, in order to perform the purification of pollutants in exhaust gas by using the catalyst at high efficiency, the mixing ratio between air and fuel in an air-fuel mixture combusted in the internal combustion engine, i.e., air-fuel ratio control is essential. In order to perform the air-fuel ratio control, an air-fuel ratio sensor is provided in an exhaust passage of the internal combustion engine and feedback control is performed such that the air-fuel ratio detected by the air-fuel ratio sensor is caused to match a given target air-fuel ratio.

On the other hand, in a multi-cylinder internal combustion engine, the air-fuel ratio control is usually performed on all cylinders by using the same control amount, and hence, even when the air-fuel ratio control is executed, there are cases where the actual air-fuel ratio varies between the cylinders. When the degree of the variation is small, the variation can be compensated by the air-fuel ratio feedback control, and the pollutant in the exhaust gas can be purified by the catalyst so that the variation does not affect exhaust emission and does not present a problem.

However, for example, when the fuel injection system of a part of the cylinders fails and the air-fuel ratio variation between the cylinders is increased, the variation deteriorates the exhaust emission and presents a problem. It is desirable to detect such a large air-fuel ratio variation as to deteriorate the exhaust emission as an abnormality. In particular, in the case of a vehicular internal combustion engine, in order to prevent the running of a vehicle with the deteriorated exhaust emission beforehand, it is required to detect the abnormal air-fuel ratio variation between cylinders in an on-board state (on-board).

For example, WO 2011/030451 discloses an apparatus that detects an abnormal variation based on the fluctuation amount per unit time of the output of an air-fuel ratio sensor. In the apparatus, considering that the fluctuation amount changes according to an intake air amount, the fluctuation amount is corrected according to the intake air amount.

Incidentally, when the abnormal air-fuel ratio variation between cylinders is detected, it is conceivable that the presence or absence of the abnormal variation is determined by comparing a parameter correlated with the degree of fluctuation of the output of the air-fuel ratio sensor with a given determination value.

Subsequently, it is conceivable that, considering that the parameter changes according to the intake air amount, the determination value as the comparison target of the parameter is changed according to the intake air amount.

However, the degree of the fluctuation of the output of the air-fuel ratio is influenced not by the magnitude of the intake air amount detected in an intake passage but by the flow amount of the exhaust gas that has actually reached the air-fuel ratio sensor. In addition, the air-fuel ratio sensor detects the air-fuel ratio of the exhaust gas that has actually reached the air-fuel ratio sensor. Further, a time lag called a transport delay is present before the exhaust gas generated in a cylinder actually reaches the air-fuel ratio sensor.

Conventionally, these matters have not been adequately considered, and hence it has been difficult to properly set the determination value. As a result, there has been a possibility of an erroneous determination and it has been difficult to secure sufficient detection accuracy.

SUMMARY OF THE INVENTION

The invention has been achieved in view of the above-described circumstances, and the invention provides an apparatus and method for detecting an abnormal air-fuel ratio variation between cylinders capable of properly setting a determination value to improve detection accuracy.

According to one aspect of the invention, there is provided an apparatus for detecting an abnormal air-fuel ratio variation between cylinders including: an air-fuel ratio sensor provided in an exhaust passage of a multi-cylinder internal combustion engine; an acquisition device configured to acquire an output of the air-fuel ratio sensor at each given sampling interval; a parameter calculation device configured to calculate a parameter correlated with a degree of fluctuation of the sensor output from a plurality of the sensor outputs acquired by the acquisition device; a determination device configured to compare the parameter calculated by the parameter calculation device with a given determination value and determine whether the abnormal air-fuel ratio variation between cylinders is present or absent; an estimation device configured to estimate a cylinder air amount as an amount of air having flown into a cylinder at each sampling interval; a storage device configured to store time-series data on the cylinder air amount at each sampling interval estimated by the estimation device; a corresponding determination value calculation device configured to determine, every time the acquisition device acquires the sensor output, a value of the cylinder air amount at a point of time earlier, by a transport delay time, than a point of time of the acquisition based on the time-series data and calculate a corresponding, determination value corresponding to the value of the determined cylinder air amount; and a determination value determination device configured to determine a determination value based on a plurality of the corresponding determination values calculated by the corresponding determination value calculation device.

In addition, the parameter calculation device may calculate an average value of a plurality of the parameters as the parameter.

Further, the determination device may determine that the abnormal air-fuel ratio variation between cylinders is present when the parameter calculated by the parameter calculation device is not less than the given determination value, and determine that the abnormal air-fuel ratio variation between cylinders is absent when the parameter calculated by the parameter calculation device is less than the given determination value.

Furthermore, the transport delay time may be a predetermined time equal to an integer multiple of the sampling interval.

Moreover, the transport delay time may be predetermined times equal to a plurality of the integer multiple of the sampling interval.

Additionally, the sampling interval may have a unit of a crank angle.

In addition, the transport delay time may be a time required for exhaust gas to reach the air-fuel ratio sensor from the cylinder.

Further, the corresponding determination value calculation device may calculate the corresponding determination value corresponding to the value of the cylinder air amount according to a given map.

Furthermore, the determination value determination device may determine an average value of the plurality of the corresponding determination values as the determination value.

Moreover, the determination value determination device may determine an average value of the plurality of the corresponding determination values in one cycle of the multi-cylinder internal combustion engine as the determination value. Additionally, the determination value determination device may determine an average value of the determination values in a plurality of cycle sections of the multi-cylinder internal combustion engine as the determination value.

In addition, the apparatus for detecting an abnormal air-fuel ratio variation between cylinders may further include an intake air amount detection device configured to be provided in an intake passage of the internal combustion engine, and the estimation device may be configured to estimate the cylinder air amount based on an intake air amount detected by the intake air amount detection device.

According to another aspect of the invention, there is provided a method for detecting an abnormal air-fuel ratio variation between cylinders of a multi-cylinder internal combustion engine provided with an air-fuel ratio sensor. In the method, an output of the air-fuel ratio sensor is acquired at each given sampling interval, a parameter correlated with a degree of fluctuation of the sensor output is calculated from a plurality of the acquired sensor outputs, a cylinder air amount as an amount of air having flown into a cylinder is estimated at each sampling interval, time-series data on the estimated cylinder air amount at each sampling interval is stored, every time the sensor output is acquired, a value of the cylinder air amount at a point of time earlier, by a transport delay time, than a point of time of the acquisition is determined based on the time-series data and a corresponding determination value corresponding to the value of the determined cylinder air amount is calculated, a determination value is determined based on a plurality of the calculated corresponding determination values, and the calculated parameter is compared with the determination value and it is thereby determined whether the abnormal air-fuel ratio variation between cylinders is present or absent.

According to the above-described apparatus and method for detecting an abnormal air-fuel ratio variation between cylinders, an excellent effect is exerted that it is possible to properly set the determination value to improve detection accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinbelow, an embodiment of the invention is described based on the accompanying drawings.

Figure 1:
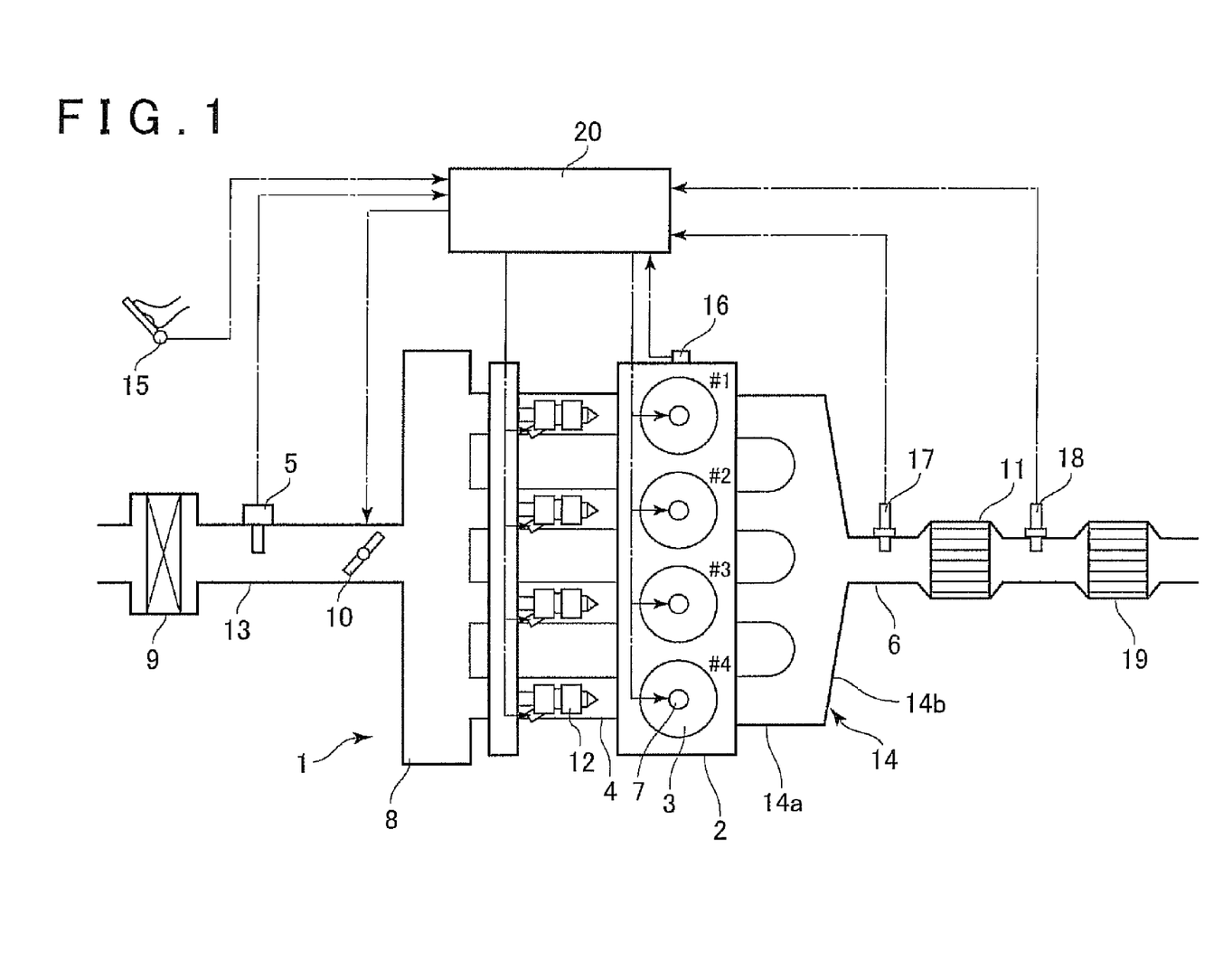
FIG. 1 is a schematic view of an internal combustion engine to which an embodiment as an example of the invention is applied.

FIG. 1 is a schematic view of an internal combustion engine according to the embodiment. As shown in the drawing, an internal combustion engine (engine) 1 generates power by causing the mixture of fuel and air to be combusted in a combustion chamber 3 formed in a cylinder block 2 to cause a piston to reciprocate in the combustion chamber 3. The internal combustion engine 1 of the embodiment is a multi-cylinder internal combustion engine mounted on a vehicle and, more specifically, the internal combustion engine 1 is an in-line four cylinder spark ignition internal combustion engine. The internal combustion engine 1 includes #1 to #4 cylinders. Note that the number of cylinders or the type is not particularly limited.

Although not shown in the drawing, in the cylinder head of the internal combustion engine 1, there are provided an intake valve for opening and closing an intake port and an exhaust valve for opening and closing an exhaust port for each cylinder, and each of the intake valve and the exhaust valve is opened and closed by a cam shaft. To the top portion of the cylinder head, a spark plug 7 for igniting the air-fuel mixture in the combustion chamber 3 is attached for each cylinder.

The intake port of each cylinder is connected to a surge tank 8 as an intake collection chamber via a branch pipe 4 of each cylinder. An intake pipe 13 is connected on the upstream side of the surge tank 8, and an air cleaner 9 is provided on the upstream end portion of the intake pipe 13. In addition, in the intake pipe 13, sequentially from the upstream side, an air flow meter 5 (intake air amount detection device) for detecting an intake air amount and an electronically controlled throttle valve 10 are incorporated. The intake port, the branch pipe 4, the surge tank 8, and the intake pipe 13 form an intake passage.

An injector (fuel injection valve) 12 for injecting fuel into the intake passage, in particular the intake port is provided for each cylinder. The fuel injected by the injector 12 is mixed with intake air to become an air-fuel mixture, and the air-fuel mixture is sucked into the combustion chamber 3 when the intake valve is opened, compressed by the piston, and ignited by the spark plug 7 to be combusted. Note that the injector may inject the fuel directly into the combustion chamber 3.

On the other hand, the exhaust port of each cylinder is connected to an exhaust manifold 14. The exhaust manifold 14 includes a branch pipe 14a constituting the upstream portion thereof that is provided for each cylinder, and an exhaust collection portion 14b constituting the downstream portion thereof. An exhaust pipe 6 is connected on the downstream side of the exhaust collection portion 14b. The exhaust port, the exhaust manifold 14, and the exhaust pipe 6 form an exhaust passage.

Catalysts made of three-way catalysts, i.e., an upstream catalyst 11 and a downstream catalyst 19 are provided in series on the upstream side and the downstream side of the exhaust pipe 6. Each of the catalysts 11 and 19 has an oxygen occlusion capability ($O_2$ storage capability). That is, each of the catalysts 11 and 19 occludes excessive oxygen in the exhaust gas to reduce NOx when the air-fuel ratio of the exhaust gas is larger (leaner) than the stoichiometric air-fuel ratio (e.g., A/F=14.6). On the other hand, when the air-fuel ratio of the exhaust gas is smaller (richer) than the stoichiometric air-fuel ratio, each of the catalysts 11 and 19 releases occluded oxygen to oxidize HC and CO in the exhaust gas.

First and second air-fuel ratio sensors for detecting the air-fuel ratio of the exhaust gas, i.e., a pre-catalyst sensor 17 and a post-catalyst sensor 18 are disposed on the upstream side and the downstream side of the upstream catalyst 11. The pre-catalyst sensor 17 and the post-catalyst sensor 18 are disposed at positions immediately before and after the upstream catalyst 11, and detect the air-fuel ratio based on the concentration of oxygen in the exhaust gas. Thus, the single pre-catalyst sensor 17 is provided in the exhaust collection portion on the upstream side of the upstream catalyst 11. In the case of the embodiment, the pre-catalyst sensor 17 corresponds to an "air-fuel ratio sensor" in the invention.

The above-described spark plug 7, throttle valve 10, and injector 12 are electrically connected to an ECU 20 as a control device. The ECU 20 includes a central processing unit (CPU), read only memory (ROM), random access memory (RAM), an input/output port, and a storage device that are not shown. In addition, as shown in the drawing, in addition to the above-described air flow meter 5, pre-catalyst sensor 17, and post-catalyst sensor 18, a crank angle sensor 16 for detecting the crank angle of the internal combustion engine 1, an accelerator depression amount sensor 15 for detecting the accelerator depression amount, and other various sensors are electrically connected to the ECU 20 via an analog-to-digital (A/D) converter and the like that are not shown. The ECU 20 controls the spark plug 7, the throttle valve 10, and the injector 12 to control an ignition timing, a fuel injection amount, a fuel injection timing, and a throttle opening degree based on detected values of various sensors such that a desired output is obtained.

The throttle valve 10 is provided with a throttle opening degree sensor (not shown), and a signal from the throttle opening degree sensor is sent to the ECU 20. The ECU 20 normally performs feedback control of the opening degree of the throttle valve 10 (throttle opening degree) such that the opening degree thereof matches a target throttle opening degree determined according to the accelerator depression amount.

The ECU 20 detects an intake air amount as the amount of intake air per unit time, i.e., an intake air flow rate based on a signal from the air flow meter 5. Subsequently, the ECU 20 detects the load of the engine 1 based on at least one of the detected accelerator depression amount, throttle opening degree, and intake air amount.

The ECU 20 detects the crank angle based on a crank pulse signal from the crank angle sensor 16, and also detects the number of revolutions of the engine 1. Herein, the "number of revolutions" mentioned herein denotes the number of revolutions per unit time, and is synonymous with a rotation speed. In the embodiment, the number of revolutions denotes the number of revolutions per minute, i.e., rpm.

Figure 2:
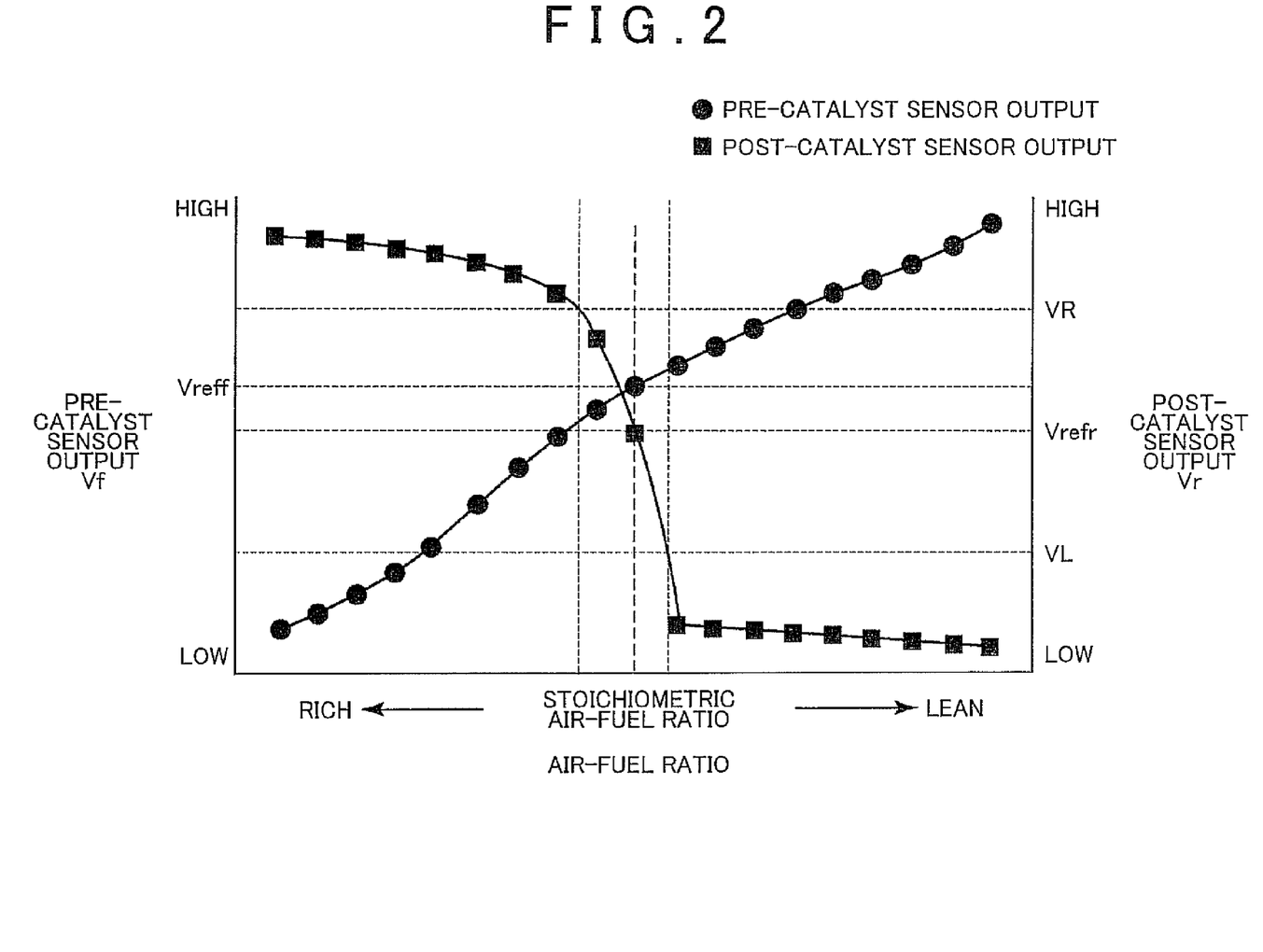
FIG. 2 is a graph showing output characteristics of a pre-catalyst sensor and a post-catalyst sensor of the internal combustion engine.

The pre-catalyst sensor 17 is constituted by what is called a wide-range air-fuel ratio sensor, and is capable of continuously detecting the air-fuel ratio over a relatively wide range. FIG. 2 shows output characteristics of the pre-catalyst sensor 17. As shown in the drawing, the pre-catalyst sensor 17 outputs a voltage signal Vf having magnitude proportional to the exhaust air-fuel ratio. The output voltage when the exhaust air-fuel ratio corresponds to the stoichiometric air-fuel ratio is Vreff (e.g., about 3.3 V).

On the other hand, the post-catalyst sensor 18 is constituted by what is called an $O_2$ sensor, and has characteristics in which an output value sharply changes after the stoichiometric air-fuel ratio. FIG. 2 shows output characteristics of the post-catalyst sensor 18. As shown in the drawing, the output voltage when the exhaust air-fuel ratio corresponds to the stoichiometric air-fuel ratio, i.e., a stoichiometric corresponding value is Vrefr (e.g., 0.45 V). The output voltage of the post-catalyst sensor 18 changes within a given range (e.g., 0 to 1 V). When the exhaust air-fuel ratio is leaner than the stoichiometric air-fuel ratio, the output voltage of the post-catalyst sensor is lower than the stoichiometric corresponding value Vrefr and, when the exhaust air-fuel ratio is richer than the stoichiometric air-fuel ratio, the output voltage of the post-catalyst sensor is higher than the stoichiometric corresponding value Vrefr.

The upstream catalyst 11 and the downstream catalyst 19 simultaneously purify NOx, HC, and CO as the pollutants in the exhaust gas when an air-fuel ratio A/F of the exhaust gas flowing into the upstream and downstream catalysts 11 and 19 is in the vicinity of the stoichiometric air-fuel ratio. The range (window) of the air-fuel ratio that allows simultaneous purification of the three pollutants at high efficiency is relatively narrow.

Consequently, during a normal operation, air-fuel ratio feedback control is executed by the ECU 20 such that the air-fuel ratio of the exhaust gas flowing into the upstream catalyst 11 is controlled to be in the vicinity of the stoichiometric air-fuel ratio. The air-fuel ratio feedback control includes main air-fuel ratio control (main air-fuel ratio feedback control) in which the exhaust air-fuel ratio detected by the pre-catalyst sensor 17 is caused to match the stoichiometric air-fuel ratio as a given target air-fuel ratio, and auxiliary air-fuel ratio control (auxiliary air-fuel ratio feedback control) in which the exhaust air-fuel ratio detected by the post-catalyst sensor 18 is caused to match the stoichiometric air-fuel ratio.

Note that the air-fuel ratio feedback control in which the target air-fuel ratio is the stoichiometric air-fuel ratio is called stoichiometric control. The stoichiometric air-fuel ratio is used as a reference air-fuel ratio.

By the way, there are cases where, for example, the injector 12 of a part (especially one cylinder) of cylinders fails and an air-fuel ratio variation (imbalance) occurs between cylinders. For example, the above-described case includes a case where the injector 12 of #1 cylinder fails, the fuel injection amount of #1 cylinder becomes larger than that of each of #2, #3, and #4 cylinders, and the air-fuel ratio thereof is significantly shifted to the rich side. Even in this case, when a relatively large correction amount is applied by the stoichiometric control described above, there are cases where the air-fuel ratio of total gas supplied to the pre-catalyst sensor 17 can be controlled to match the stoichiometric air-fuel ratio. However, in terms of the air-fuel ratios of the individual cylinders, the air-fuel ratio of #1 cylinder is significantly richer than the stoichiometric air-fuel ratio, those of #2, #3, and #4 cylinders are slightly leaner than the stoichiometric air-fuel ratio, and the stoichiometric air-fuel ratio is attained only as the overall air-fuel ratio, which is apparently inappropriate in terms of the emission. Consequently, in the embodiment, there is provided an apparatus for detecting the above-described abnormal air-fuel ratio variation between cylinders.

Hereinbelow, the aspect of abnormal variation detection in the embodiment is described.

Figure 3:
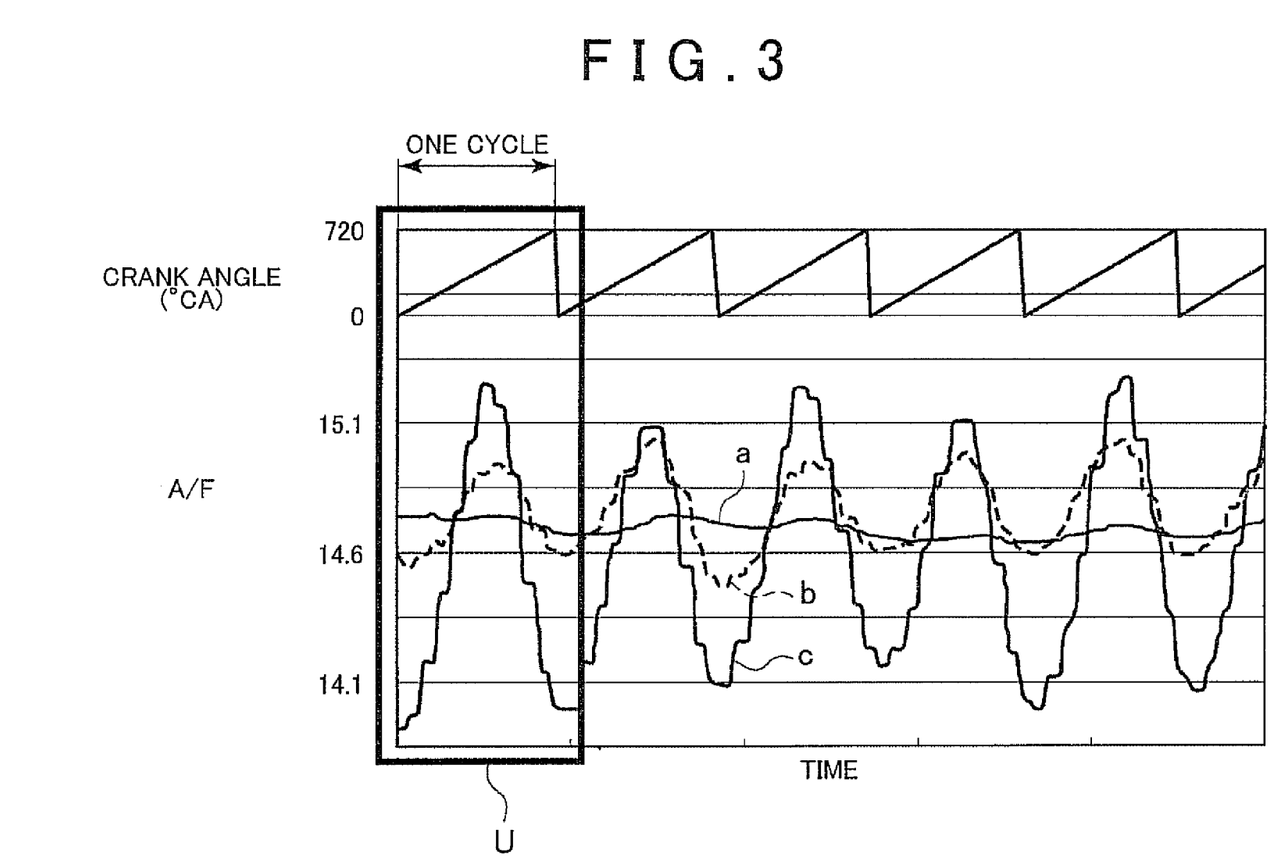
FIG. 3 is a graph showing a fluctuation in exhaust air-fuel ratio corresponding to the degree of an air-fuel ratio variation between cylinders of the internal combustion engine.

As shown in FIG. 3, when the air-fuel ratio variation between cylinders occurs, a fluctuation in exhaust air-fuel ratio in one engine cycle (=720° CA) is increased. Each of air-fuel ratio diagrams a, b, and c shown in a graph in the lower part of FIG. 3 shows a detected air-fuel ratio A/F by the pre-catalyst sensor 17. The air-fuel ratio diagram a shows the detected air-fuel ratio A/F in a case where there is no variation, the air-fuel ratio diagram b shows the detected air-fuel ratio A/F in a case where the air-fuel ratio of only one cylinder is richer than the stoichiometric air-fuel ratio at an imbalance ratio of 20%, and the air-fuel ratio diagram c shows the detected air-fuel ratio A/F in a case where the air-fuel ratio of only one cylinder is richer than the stoichiometric air-fuel ratio at an imbalance ratio of 50%. As can be seen, as the degree of the variation becomes larger, the amplitude of the air-fuel ratio fluctuation becomes larger.

The imbalance ratio (%) mentioned herein is a parameter correlated with the degree of the air-fuel ratio variation between cylinders. That is, the imbalance ratio is a value that indicates, when only one of cylinders has a fuel injection amount shift, the ratio of the shift of the fuel injection amount of the cylinder having the fuel injection amount shift (imbalance cylinder) with respect to the fuel injection amount of the cylinder without the fuel injection amount shift (balance cylinder), i.e., a reference injection amount. When it is assumed that the imbalance ratio is IB, the fuel injection amount of the imbalance cylinder is Qib, and the fuel injection amount of the balance cylinder, i.e., the reference injection amount is Qs, the imbalance ratio is represented by IB=(Qib−Qs)/Qs. As the imbalance ratio IB is larger, the shift of the fuel injection amount of the imbalance cylinder with respect to the fuel injection amount of the balance cylinder is larger, and the degree of the air-fuel ratio variation is larger.

As can be seen from FIG. 3, as the imbalance ratio is larger, i.e., the degree of the air-fuel ratio variation between cylinders is larger, the output fluctuation of the pre-catalyst sensor 17 becomes larger.

Therefore, by using this characteristic, an output fluctuation parameter X correlated with the degree of the output fluctuation of the pre-catalyst sensor 17 is used as a parameter correlated with the degree of the air-fuel ratio variation between cylinders, and the output fluctuation parameter X is calculated (or detected) in the embodiment. The abnormal variation is detected based on the calculated output fluctuation parameter X. Note that the above-described imbalance ratio is used only for the purpose of explanation.

Figure 4:
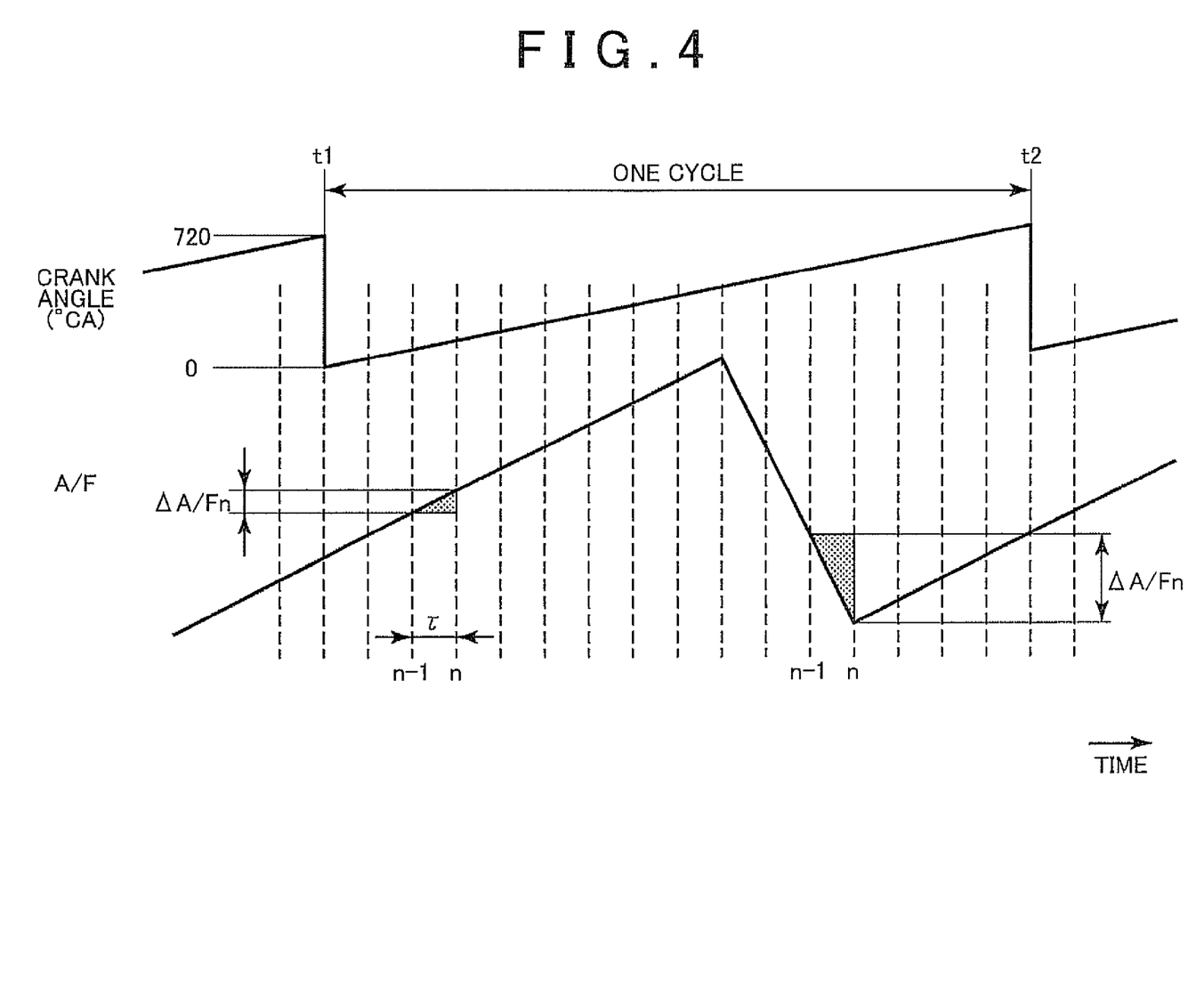
FIG. 4 is an enlarged view corresponding to a U section of FIG. 3.

Hereinbelow, the calculation method of the output fluctuation parameter X is described. FIG. 4 is an enlarged view corresponding to a U section of FIG. 3, and particularly shows the fluctuation of the pre-catalyst sensor output in one engine cycle schematically. As the pre-catalyst sensor output, a value obtained by converting the output voltage Vf of the pre-catalyst sensor 17 into the air-fuel ratio A/F is used. However, it is also possible to directly use the output voltage Vf of the pre-catalyst sensor 17.

As shown in a graph in the lower part of FIG. 4, the ECU 20 acquires the value of the pre-catalyst sensor output A/F at each given sampling interval $\tau$ in one engine cycle. Subsequently, the ECU 20 determines an absolute value (referred to as an output difference) $\Delta A/F_n$ of a difference between the value $A/F_n$ acquired at the present timing (n) and the value $A/F_{n-1}$ acquired at the previous timing (n−1) by the following equation (1). The output difference $\Delta A/F_n$ translates into a differential value or a gradient at the present timing.

[Equation 1]

$$\Delta A/F_n = |A/F_n - A/F_{n-1}| \quad (1)$$

Most simply speaking, the output difference $\Delta A/F_n$ indicates the fluctuation of the pre-catalyst sensor output. This is because, as the degree of the fluctuation becomes larger, the gradient of the air-fuel ratio diagram becomes larger and the output difference $\Delta A/F_n$ becomes larger. Accordingly, it is possible to use the value of the output difference $\Delta A/F_n$ at a given timing as the output fluctuation parameter.

Note that, in the embodiment, in order to improve accuracy, the average value of a plurality of the output differences $\Delta A/F_n$ is used as the output fluctuation parameter. In the embodiment, the output differences $\Delta A/F_n$ at the individual timings during one engine cycle are totalized, the final total value is divided by the number of samples N, and the average value of the output difference $\Delta A/F_n$ in one engine cycle is thereby determined. Further, the average values of the output difference $\Delta A/F_n$ during M engine cycles (e.g., M=100) are totalized, the final total value is divided by the number of cycles M, and the average value of the output difference $\Delta A/F_n$ in M engine cycles is thereby determined. The final average value obtained in this manner is used as the output fluctuation parameter X. As the degree of the fluctuation of the pre-catalyst sensor output becomes larger, the output fluctuation parameter X becomes larger.

Herein, the sampling interval $\tau$ has the unit of the crank angle ° CA. The sampling interval $\tau$ can be set to, e.g., 10° CA and, in this case, the number of samples N in one engine cycle is given by 720/10=72. Note that the sampling interval $\tau$ can be set to other crank angles.

The pre-catalyst sensor output A/F increases in some cases and decreases in other cases, and hence the output difference $\Delta A/F_n$ or the average value thereof in only one of the case where the pre-catalyst sensor output A/F increases and the case where the pre-catalyst sensor output A/F decreases may be determined and used as the output fluctuation parameter. In particular, in a case where the air-fuel ratio of only one cylinder is richer than the stoichiometric air-fuel ratio, when the pre-catalyst sensor receives the exhaust gas from the one cylinder, the output thereof tends to rapidly decrease (shifts to the rich side), and hence the value only when the pre-catalyst sensor output decreases can be used for the detection of the shift to the rich side. However, the value is not limited thereto, and the value only when the pre-catalyst sensor output increases can also be used.

In addition, any value correlated with the degree of the fluctuation of the pre-catalyst sensor output can be used as the output fluctuation parameter. For example, based on a difference between the maximum peak and the minimum peak of the pre-catalyst sensor output in one engine cycle (what is called a peak to peak), or an absolute value of the maximum peak or the minimum peak of a second-order differential value, the output fluctuation parameter can be calculated.

This is because, as the degree of the fluctuation of the pre-catalyst sensor output is larger, the difference between the maximum and minimum peaks of the pre-catalyst sensor output becomes larger and the absolute value of the maximum or minimum peak of the second-order differential value becomes larger.

Figure 5:
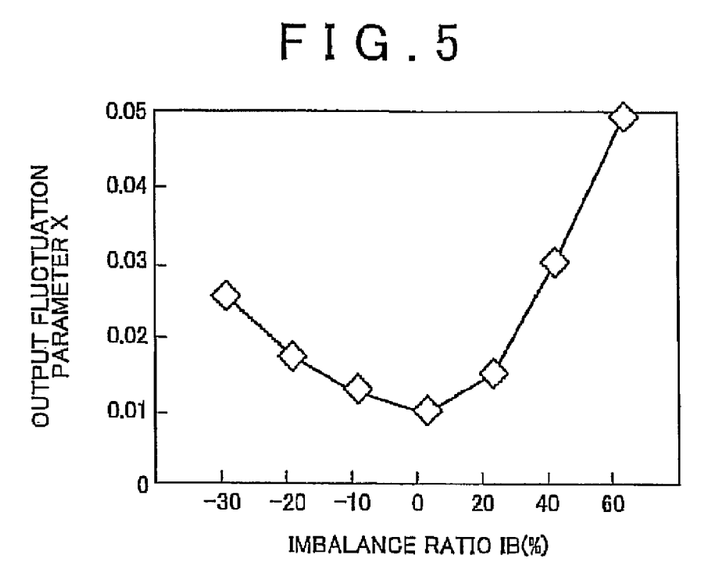
FIG. 5 is a graph showing the relationship between an imbalance ratio and an output fluctuation parameter of the internal combustion engine.

FIG. 5 shows the relationship between the imbalance ratio IB (%) and the output fluctuation parameter X. As shown in the drawing, there is a strong correlation between the imbalance ratio IB and the output fluctuation parameter X and, as the absolute value of the imbalance ratio IB increases, the output fluctuation parameter X increases.

The presence or absence of the abnormal variation is determined by comparing the calculated output fluctuation parameter X with a given determination value. For example, when the calculated output fluctuation parameter X is not less than the determination value, it is determined that the abnormal variation is present (abnormal state) and, when the calculated output fluctuation parameter X is less than the determination value, it is determined that the abnormal variation is absent (normal state).

Incidentally, the value of the output fluctuation parameter X changes in accordance with not only the degree of the air-fuel ratio variation between cylinders but also the flow amount of the exhaust gas reaching or supplied to the pre-catalyst sensor 17.

Figure 6:
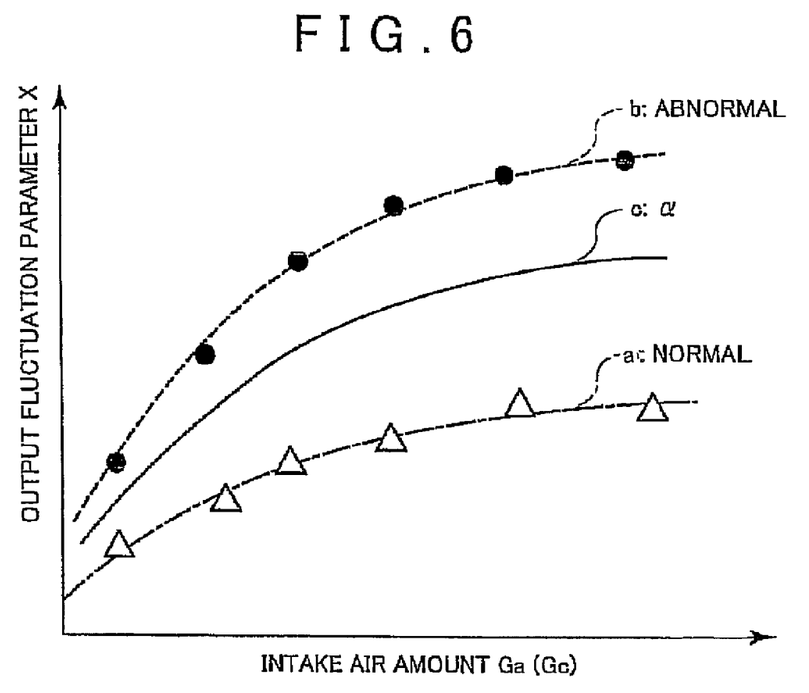
FIG. 6 is a graph showing the relationship between the output fluctuation parameter and an intake air amount of the internal combustion engine.

FIG. 6 shows the relationship between the output fluctuation parameter X and an intake air amount Ga detected by the air flow meter 5. In the drawing, open triangles and a line a indicate the normal case without the abnormal variation, while solid circles and a line b indicate the abnormal case with the abnormal variation. The relationship shown in the drawing is the relationship obtained under the condition of the constant intake air amount. In this case, the intake air amount Ga can be considered to be equal to the flow amount of the exhaust gas that has actually reached the pre-catalyst sensor 17.

As shown in the drawing, in both normal and abnormal cases, the output fluctuation parameter X tends to increase as the intake air amount Ga increases. Note that, when the intake air amount is the same, the output fluctuation parameter X during the abnormal state is naturally larger than the output fluctuation parameter X during the normal state.

Accordingly, between the parameter curve during the normal state a and the parameter curve during the abnormal state b, a determination value curve c that defines a determination value α determining the boundary between the normal state and the abnormal state is set. Similarly to the output fluctuation parameter X, the determination value curve c also tends to increase as the intake air amount Ga increases.

With the arrangement, for the output fluctuation parameter X calculated under a certain intake air amount, the determination value α on the determination value curve c corresponding to the same intake air amount is used and, by comparing the output fluctuation parameter X with the determination value α, it is possible to execute precise determination that reflects the influence by the intake air amount.

In the embodiment, the determination value curve c shown in FIG. 6 is empirically determined in advance and stored in the ECU 20 in the form of a map (or a function, the same applies hereinafter). However, although described later in detail, in the embodiment, a cylinder air amount Gc as the amount of air having flown into the cylinder is used instead of the intake air amount Ga, and hence the determination value curve c that defines the relationship between the cylinder air amount Gc and the determination value α is stored in the ECU 20.

Incidentally, the output fluctuation parameter X is substantially influenced not by the magnitude of the intake air amount Ga detected by the air flow meter 5 provided in the intake passage but by the flow amount of the exhaust gas that has actually reached the pre-catalyst sensor 17. In addition, the pre-catalyst sensor 17 detects the air-fuel ratio of the exhaust gas that has actually reached the pre-catalyst sensor 17. Further, before the exhaust gas generated in the combustion chamber 3 in the cylinder actually reaches the pre-catalyst sensor 17, there exists a time lag called a transport delay.

Conventionally, these matters have not been adequately considered, and hence it has been difficult to properly set the determination value α. As a result, there has been a possibility of an erroneous determination and it has been difficult to secure sufficient detection accuracy.

Figure 7:
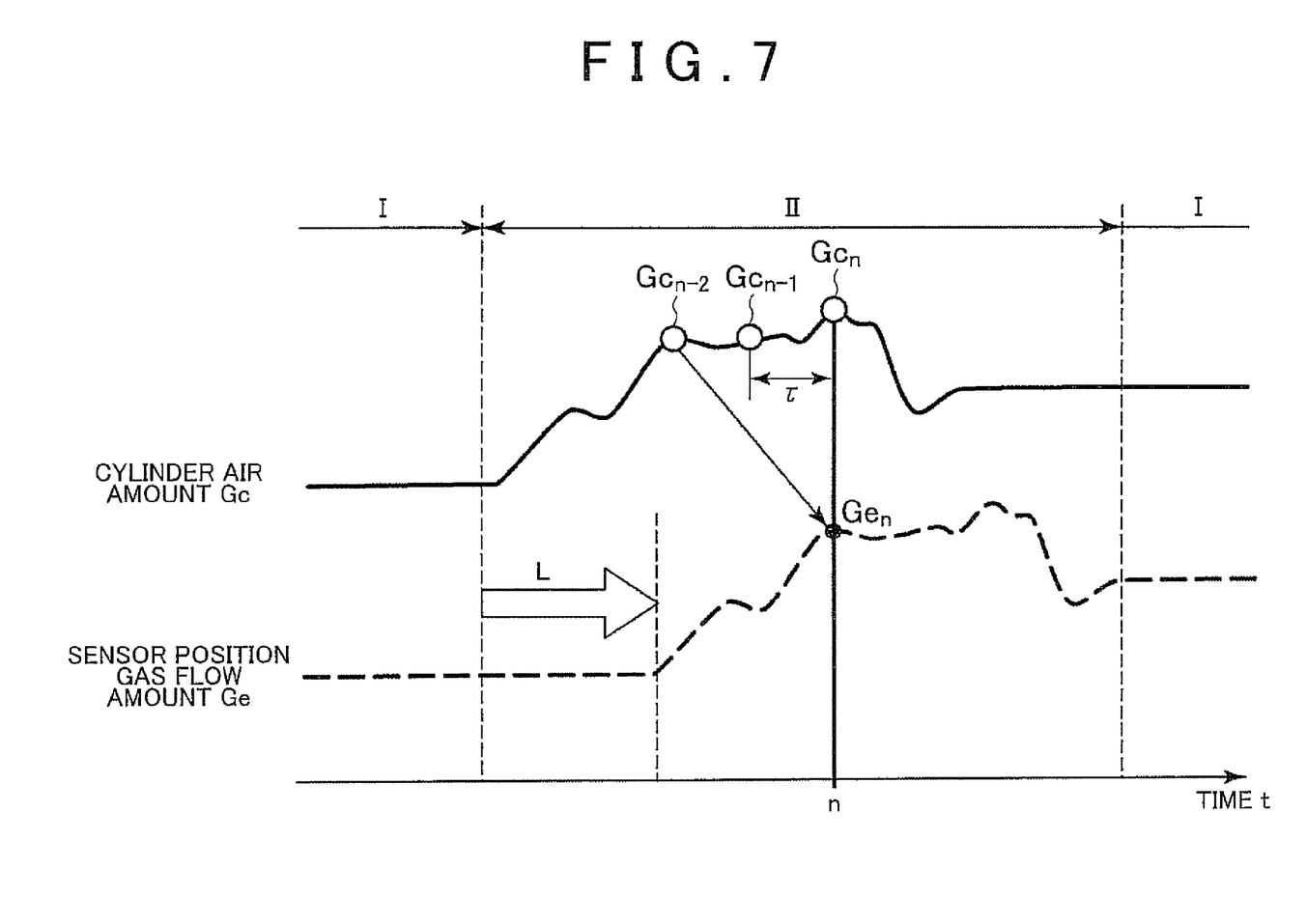
FIG. 7 is a time chart showing the temporal change of each of a cylinder air amount and an exhaust gas flow amount at the position of the pre-catalyst sensor of the internal combustion engine.

Hereinbelow, this point is described by using FIG. 7. A graph shown in the upper part of FIG. 7 shows the cylinder air amount Gc as the amount of air having flown into (or present in) the cylinder. In addition, a graph shown in the lower part of FIG. 7 shows the flow amount of the exhaust gas having reached the position of the pre-catalyst sensor 17 (referred to as a sensor position gas flow amount) Ge. Air flown into the cylinder becomes the air-fuel mixture to be combusted, the exhaust gas is thereby generated, and the exhaust gas reaches the pre-catalyst sensor 17 from the cylinder with a delay of a transport delay time L. As a result, there is a correlation between the cylinder air amount Gc and the sensor position gas flow amount Ge except for the time lag resulting from the transport delay.

In the example shown in the drawing, the cylinder air amount at a certain sampling time n is represented by $Gc_n$, the cylinder air amount at a sampling time in the first previous sampling interval (τ) is represented by $Gc_{n-1}$, and the cylinder air amount at a sampling time in the second previous sampling interval, which precedes the first previous sampling interval (τ), is represented by $Gc_{n-2}$.

Before the embodiment is described, a comparative example is described for the sake of convenience. At the sampling time n, the value of the pre-catalyst sensor output $A/F_n$ is acquired and the output difference $\Delta A/F_n$ is also calculated by the equation (1).

On the other hand, at the sampling time n, a corresponding determination value $\alpha_n$ corresponding to the pre-catalyst sensor output $A/F_n$ is also calculated. Although described later in detail, the corresponding determination value $\alpha_n$ is a value serving as a basis when the determination value α is determined. Specifically, the average value of a plurality of corresponding determination values $\alpha_n$ is used as the determination value α.

In the comparative example, the corresponding determination value $\alpha_n$ is calculated from a map shown in FIG. 6 based on the cylinder air amount $Gc_n$ at the sampling time n. That is, the corresponding determination value $\alpha_n$ corresponding to the cylinder air amount $Gc_n$ is calculated from the map.

However, the cylinder air amount $Gc_n$ and the corresponding determination value $\alpha_n$ at the sampling time n do not correspond to a sensor position gas flow amount $Ge_n$ at the sampling time n. The cylinder air amount at a time earlier than the sampling time n by the transport delay time L corresponds to the sensor position gas flow amount $Ge_n$ and, in the case of the example shown in the drawing, the cylinder air amount corresponding thereto is the cylinder air amount $Gc_{n-2}$ at the sampling time in the second previous sampling interval (2τ).

Consequently, as a result, the output difference $\Delta A/F_n$ and the corresponding determination value $\alpha_n$ calculated at the sampling time n do not correspond to each other, which results in an inappropriate finally calculated determination value α.

To cope with this, in the embodiment, based on the cylinder air amount at a point of time earlier than the sampling time n by the transport delay time L, in the example shown in the drawing, the cylinder air amount $Gc_{n-2}$ at a point of time in the second previous sampling interval, the corresponding determination value $\alpha_n$ at the sampling time n is calculated from the map shown in FIG. 6.

With this, it is possible to cause the output difference $\Delta A/F_n$ and the corresponding determination value $\alpha_n$ at the sampling time n to correspond to each other. In addition, it is possible to set the finally calculated determination value α to an appropriate value to improve detection accuracy.

In addition, according to the embodiment, even during a time period II when the cylinder air amount Gc changes and the cylinder air amount Gc and the sensor position gas flow amount Ge at the same sampling time do not correspond to each other as the result of the change of the cylinder air amount Gc, it is possible to calculate the appropriate corresponding determination value $\alpha_n$ corresponding to the output difference $\Delta A/F_n$. Therefore, the embodiment is extremely advantageous not only in improving the detection accuracy but also in improving robustness and securing an erroneous detection margin, a detection opportunity, or a detection frequency.

That is, during a time period I when they correspond to each other, as in the comparative example, there is no problem in calculating the corresponding determination value $\alpha_n$ based on the cylinder air amount $Gc_n$ at the sampling time n. However, during the time period II when they do not correspond to each other, in the comparative example, it is not possible to obtain the appropriate corresponding determination value $\alpha_n$ corresponding to the output difference $\Delta A/F_n$ at the sampling time n, as described above.

As a result, for example, during acceleration in which the cylinder air amount Gc increases, the cylinder air amount $Gc_n$ becomes large relative to the sensor position gas flow amount $Ge_n$ at a certain sampling time n, the corresponding determination value $\alpha_n$ is increased correspondingly, and there is a possibility that the abnormal state is determined as the normal state by mistake.

Conversely, during deceleration in which the cylinder air amount Gc decreases, the cylinder air amount $Gc_n$ becomes small relative to the sensor position gas flow amount $Ge_n$ at the sampling time n, the corresponding determination value $\alpha_n$ is reduced correspondingly, and there is a possibility that the normal state is determined as the abnormal state by mistake.

However, in the embodiment, it is possible to maintain the correspondence between them even during the time period II when they do not correspond to each other, and calculate the appropriate corresponding determination value $\alpha_n$. As a result, even when the cylinder air amount Gc fluctuates due to acceleration or deceleration, it is possible to calculate the appropriate corresponding determination value $\alpha_n$. Consequently, it is possible to improve the robustness and secure the erroneous detection margin. In addition, the abnormal variation detection is performed only under a steady operation condition in which the fluctuation width of the intake air amount Ga (this correlates with the cylinder air amount Gc) in a given time period is not more than a given value. In the case of the embodiment, it is possible to increase the fluctuation width of the intake air amount Ga to a width larger than that in the comparative example, i.e., allow more fluctuation of the cylinder air amount Gc than in the comparative example, and, as a result, secure many detection opportunities or high detection frequency.

Incidentally, the ECU 20 estimates the cylinder air amount $Gc_n$ at each sampling interval τ, and stores time-series data on the estimated cylinder air amount $Gc_n$ at each sampling interval τ in its own memory.

With regard to the estimation of the cylinder air amount Gc, the ECU 20 estimates the cylinder air amount Gc based on the intake air amount Ga detected by the air flow meter 5. For example, the ECU 20 acquires the value of the intake air amount Ga detected by the air flow meter 5 at a certain sampling time n, and also estimates or predicts the cylinder air amount Gc at the sampling time n or a subsequent given sampling time based on the value of the acquired intake air amount Ga. As the estimation method, various methods such as a method using a map and a method in which calculation is performed using a model can be used, and the methods are already available so that detailed description thereof is omitted. Note that a parameter (e.g., the number of revolutions of the engine or the like) other than the intake air amount Ga may also be used in the estimation.

Figure 8:
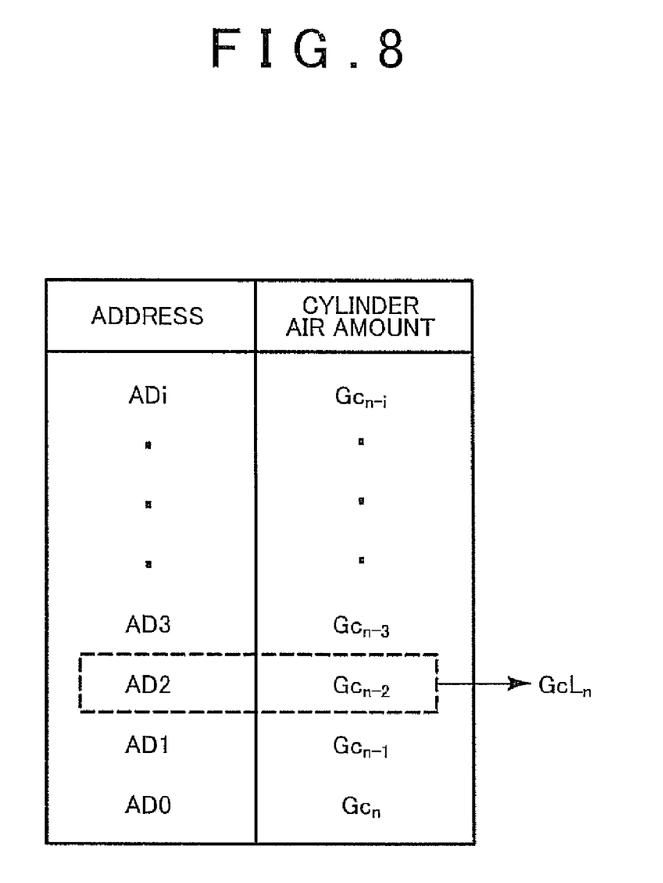
FIG. 8 is a view showing the storage content of a storage device in an electronic control unit (ECU) shown in FIG. 1.

FIG. 8 shows the storage content of the memory. As shown in the drawing, in a memory address AD0, the value of the cylinder air amount $Gc_n$ estimated at the present sampling time n is stored. In a memory address AD1, the value of the cylinder air amount $Gc_{n-1}$ estimated at the previous sampling time in the first previous sampling interval n−1 is stored. Similarly, in a memory address AD2, the value of the cylinder air amount $Gc_{n-2}$ estimated at the sampling time in the second previous sampling interval n−2 is stored and, in a memory address ADi, the value of the cylinder air amount $Gc_{n-i}$ estimated at the sampling time in the i-th previous sampling interval n−i is stored. In this manner, the individual values of the stored cylinder air amounts $Gc_n$ to $Gc_{n-i}$ constitute the time-series data.

The storage content of the memory is updated at every sampling interval τ and the latest cylinder air amount data is constantly stored in the address AD0. The oldest cylinder air amount data in the address ADi is erased at every sampling interval τ.

In the embodiment, at the present sampling time n, the pre-catalyst sensor output $A/F_n$ is acquired, the output difference $\Delta A/F_n$ is calculated, and the value of the cylinder air amount $Gc_{n-K}$ at the sampling time in the K-th previous sampling interval n−K is read from the time-series data. The read cylinder air amount $Gc_{n-K}$ is used as a corresponding air amount at the present sampling time $GcL_n$. Subsequently, based on the value of the corresponding air amount $GcL_n$, the corresponding determination value $\alpha_n$ at the present sampling time n is calculated. That is, from the map shown in FIG. 6, the corresponding determination value $\alpha_n$ corresponding to the corresponding air amount $GcL_n$ is calculated.

When K is assumed to be, e.g., 2, as shown in FIG. 8, the cylinder air amount $Gc_{n-2}$ at the sampling time in the second previous sampling interval n−2 is used as the corresponding air amount $GcL_n$, and the corresponding determination value $\alpha_n$ at the present sampling time n is calculated based on the corresponding air amount $GcL_n$.

K is a constant that defines the transport delay time L. That is, in the embodiment, the product of the sampling interval τ and the constant K is considered to be equal to the transport delay time L. The constant K is an integer of 1 or more. Thus, the transport delay time L is a predetermined time equal to an integer multiple of the sampling interval τ. When the constant K is set to 2 or more, the transport delay time L is a predetermined time equal to the integer multiple of the sampling interval τ in which the integer is 2 or more.

The constant K is a characteristic value or an adapted value determined for each engine by hardware factors such as the length, capacity, and shape of the exhaust passage from the entrance of the exhaust port to the pre-catalyst sensor 17 and a piston displacement, and is empirically determined in advance and stored in the ECU 20.

By determining the transport delay time L as a value obtained by multiplying the sampling interval τ by K by using the constant K as the adapted value, it is possible to define the transport delay time L, determine the corresponding air amount $GcL_n$ at a time earlier by the transport delay time L, and calculate the corresponding determination value $\alpha_n$ at the present sampling time n by using the corresponding air amount $GcL_n$ by means of the extremely simple method.

Note that, in the comparative example, the corresponding determination value $\alpha_n$ is calculated based on the cylinder air amount $Gc_n$ at the present sampling time n. With this, the cylinder air amount Gc does not correspond to the pre-catalyst sensor output $A/F_n$ at the present sampling time n and the inappropriate corresponding determination value $\alpha_n$ is calculated. In the embodiment, the corresponding determination value $\alpha_n$ is calculated based on the cylinder air amount $Gc_{n-K}$ at a point of time earlier than the present sampling time n by the transport delay time L=Kτ, and hence it is possible to calculate the appropriate corresponding determination value $\alpha_n$.

Herein, as the number of revolutions of the engine is increased, the gas flow rate is increased, and the transport delay time L per unit time is reduced. However, in the embodiment, the sampling interval τ is set on a crank angle basis, and the transport delay time L is defined as a time obtained by multiplying the sampling interval τ by K. Therefore, even when the increase in gas flow rate due to the increase in the number of revolutions occurs, it is possible to reduce the transport delay time L per unit time correspondingly to the increase. Eventually, even when the number of revolutions of the engine or the gas flow rate changes, it is possible to constantly obtain the precise corresponding air amount $GcL_n$ to calculate the precise corresponding determination value $\alpha_n$.

Note that the constant K is not limited to 2, and can be set to any value in accordance with test results. In the memory, it is sufficient to store data at least up to the K-th previous sampling interval, and it is not necessarily required to store data of the (K+1)-th previous sampling interval or prior thereto, but the data of the (K+1)-th previous sampling interval or prior thereto is stored for the sake of convenience in the embodiment.

Based on the time-series data in the memory, by means of complementary calculation, it is also possible to determine, e.g., the cylinder air amount at the sampling time in the 2.5-th previous sampling interval as the corresponding air amount $GcL_n$. In this case, the average value of the cylinder air amount at the sampling time in the second previous sampling interval $Gc_{n-2}$ and the cylinder air amount at the sampling time in the third previous sampling interval $Gc_{n-3}$ is determined as the corresponding air amount $GcL_n$, and the corresponding air amount $Gc_n$ is used as a basis for the calculation of the corresponding determination value $\alpha_n$ at the present sampling time n. Eventually, the transport delay time L may not necessarily be equal to the integer multiple of the sampling interval τ.

Figure 9:
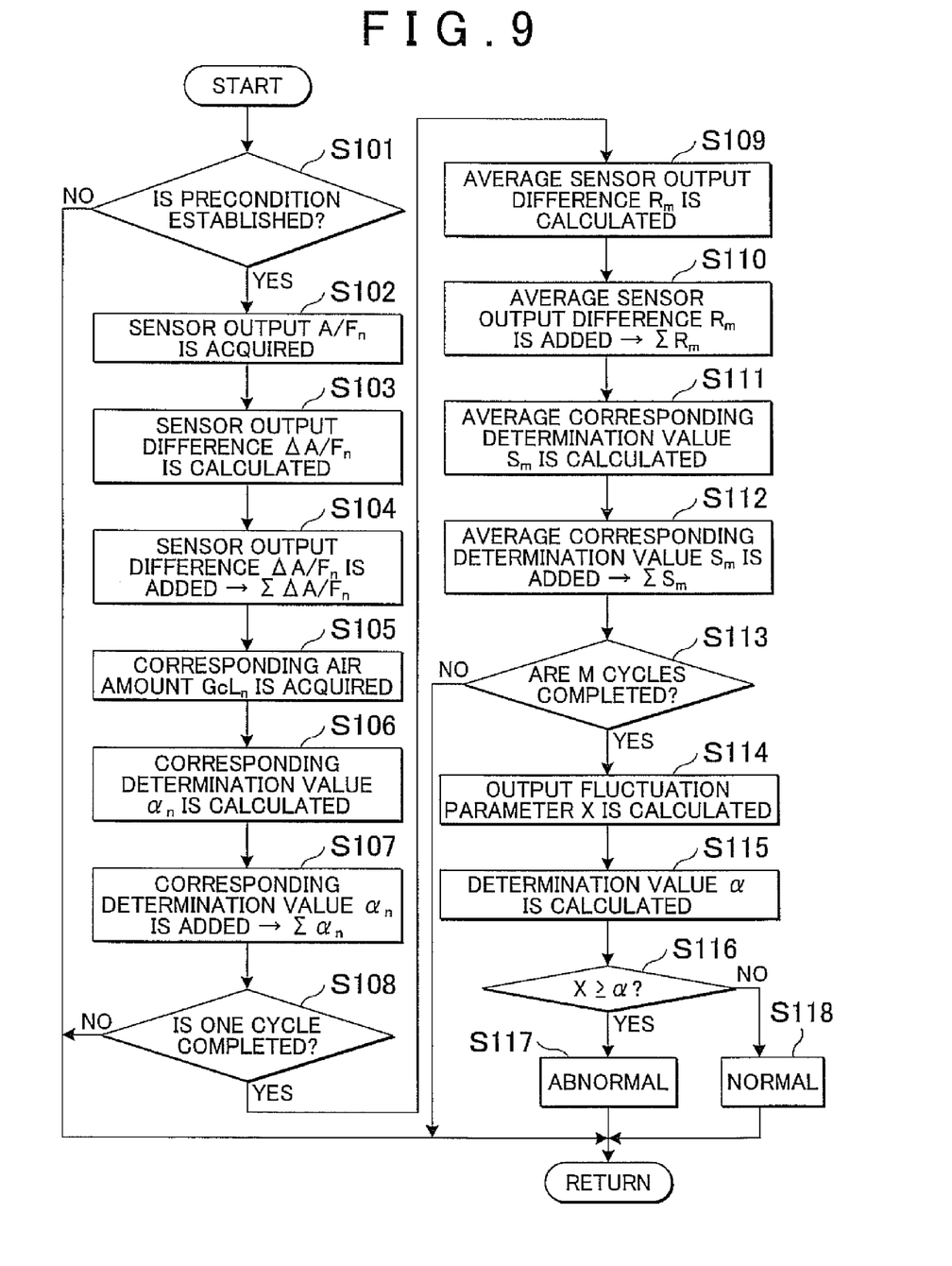
FIG. 9 is a flowchart of an abnormal variation detection routine of the embodiment.

Hereinbelow, with reference to FIG. 9, an abnormal variation detection routine according to the embodiment is described. The routine is repeatedly executed by the ECU 20 at each sampling interval τ (° CA).

First, in Step 101, it is determined whether or not a given precondition suitable for performing abnormality detection is established. The precondition is established when, e.g., the following conditions are established.

(1) The warming up of the engine is completed. When a liquid temperature detected by a liquid temperature sensor (not shown) is not less than a given value (e.g., 75° C.), the ECU 20 determines that the warming up thereof is completed.

(2) The pre-catalyst sensor 17 and the post-catalyst sensor 18 are activated. When the values of impedances of the sensors are values corresponding to their respective given activation temperatures, the ECU 20 determines that the sensors are activated.

(3) The upstream catalyst 11 and the downstream catalyst 19 are activated. When separately estimated values of temperatures of the upstream catalyst 11 and the downstream catalyst 19 are values corresponding to their respective given activation temperatures, the ECU 20 determines that the catalysts are activated.

(4) The engine is in a steady operation.

(5) The intake air amount Ga detected by the air flow meter 5 is not less than a given value (e.g., 20 (g/s)).

(6) The stoichiometric control is performed.

When the precondition is not established, the routine is ended. On the other hand, when the precondition is established, the routine proceeds to Step 102 where the abnormality detection is substantially started or executed.

With regard to Condition (4), as described above, the ECU 20 determines that the engine is in the steady operation when the fluctuation width of the intake air amount Ga during the given time period is not more than the given value. When Condition (4) is not established, the abnormality detection is not started. When Condition (4) becomes unestablished during the abnormality detection, the abnormality detection is canceled.

According to the embodiment, as described above, even when the cylinder air amount Gc fluctuates with the fluctuation in the intake air amount Ga, it is possible to calculate the corresponding determination value $\alpha_n$ during the fluctuation with high accuracy. Therefore, it is possible to set the fluctuation width of the intake air amount Ga to a relatively large value so that it is possible to loosen the condition for the start or cancellation of the abnormality detection and secure more detection opportunities or higher detection frequency.

In Step S102, the pre-catalyst sensor output $A/F_n$ at the present sampling time n or timing is acquired. Note that the pre-catalyst sensor output $A/F_n$ is a value obtained by converting the output voltage Vf of the pre-catalyst sensor 17 into the air-fuel ratio.

In Step S103, the sensor output difference $\Delta A/F_n$ at the present timing is calculated by the above-described equation (1).

In Step 104, the sensor output difference $\Delta A/F_n$ is added, i.e., a total sensor output difference $\tau\Delta A/F_n$ at the present timing is calculated by the following equation (2).

[Equation 2]

$$\tau\Delta A/F_n = \Sigma\Delta A/F_{n-1} + \Delta A/F_n \qquad (2)$$

In Step S105, the corresponding air amount $GcL_n$ at the present timing is read from the memory, as described with reference to FIG. 8. In the case of the embodiment, the cylinder air amount at the sampling time in the second previous sampling interval $Gc_{n-2}$ stored in the address AD2 in the memory is read as the corresponding air amount $GcL_n$ at the present timing.

In Step S106, the corresponding determination value $α_n$ corresponding to the corresponding air amount $GcL_n$ at the present timing is calculated from the map shown in FIG. 6.

In Step S107, the corresponding determination value $α_n$ is added, i.e., a total corresponding determination value $Σα_n$ at the present timing is calculated by the following equation (3).

[Equation 3]

$$Σα_n = Σα_{n-1} + α_n \quad (3)$$

In Step S108, it is determined whether or not one engine cycle is completed. When one engine cycle is not completed, the routine is ended and, when one engine cycle is completed, the routine proceeds to Step S109.

In Step S109, the final total sensor output difference $ΣΔA/Fn$ at the point of completion of the present engine cycle is divided by the number of samples N to be averaged, and an average sensor output difference R. is thereby calculated.

Subsequently, in Step S110, the average sensor output difference $R_m$ is added, i.e., a total average sensor output difference $ΣR_m$ at the point of completion of the present engine cycle is calculated by the following equation (4).

[Equation 4]

$$ΣR_m = ΣR_{m-1} + R_m \quad (4)$$

Similarly, in Step S111, a final total corresponding determination value $Σα_n$ at the point of completion of the present engine cycle is divided by the number of samples N to be averaged, and an average corresponding determination value $S_m$ is thereby calculated.

Then, in Step S112, the average corresponding determination value $S_m$ is added, i.e., the total average corresponding determination value $ΣS_m$ at the point of completion of the present engine cycle is calculated by the following equation (5).

[Equation 5]

$$ΣS_m = ΣS_{m-1} + S_m \quad (5)$$

Next, in Step S113, it is determined whether or not M engine cycles (M is an integer of 2 or more and, e.g., 100) are completed. When M engine cycles are not completed, the routine is ended and, when M engine cycles are completed, the routine proceeds to Step S114.

In Step S114, the final total average sensor output difference $ΣR_m$ at the point of completion of M engine cycles is divided by the number of cycles M to be averaged, and the output fluctuation parameter X is thereby calculated. That is, the average value of a plurality of (N×M) sensor output differences $ΔA/F_n$ is calculated as the final output fluctuation parameter X.

Similarly, in Step 115, the final total average corresponding determination value $ΣS_m$ at the point of completion of M engine cycles is divided by the number of cycles M to be averaged, and the determination value α is thereby calculated. That is, the average value of a plurality of (N×M) corresponding determination values $α_n$ is determined as the final determination value α.

Thus, since the corresponding determination values $α_n$ corresponding to the sensor outputs $A/F_n$ and the sensor output differences $ΔA/F_n$ at the individual sampling times are averaged and the determination value α is thereby determined, it is possible to determine the appropriate determination value α.

Subsequently, in Step S116, the output fluctuation parameter X is compared with the determination value α.

When the output fluctuation parameter X is not less than the determination value α, the routine proceeds to Step S117 where it is determined that the abnormal variation is present, i.e., the abnormal state is established, and the routine is ended. Note that it is preferable to activate an alarm device such as a check lamp or the like in order to notify a user of the presence of the abnormality simultaneously with the determination of the abnormal state.

On the other hand, when the output fluctuation parameter X is less than the determination value α, the routine proceeds to Step S118 where it is determined that the abnormal variation is absent, i.e., the normal state is established, and the routine is ended.

Although the preferred embodiment of the invention has been described above in detail, other various embodiments of the invention are conceivable. The above-described numerical values are only illustrative, and can be appropriately changed.

The embodiment of the invention is not limited to the above-described embodiment and the invention includes all modifications, applications, and equivalents included in the spirit of the invention defined by the scope of claims. Consequently, the invention should not be interpreted in a limited way and can be applied to any other technology included within the scope of the spirit of the invention.

What is claimed is:

1. An apparatus for detecting an abnormal air-fuel ratio variation between cylinders, comprising:
    an air-fuel ratio sensor provided in an exhaust passage of a multi-cylinder internal combustion engine;
    an acquisition device configured to acquire an output of the air-fuel ratio sensor at each given sampling interval;
    a parameter calculation device configured to calculate a parameter correlated with a degree of fluctuation of the sensor output from a plurality of the sensor outputs acquired by the acquisition device;
    a determination device configured to compare the parameter calculated by the parameter calculation device with a given determination value and determine whether the abnormal air-fuel ratio variation between cylinders is present or absent;
    an estimation device configured to estimate a cylinder air amount as an amount of air having flown into a cylinder at each sampling interval;
    a storage device configured to store time-series data on the cylinder air amount at each sampling interval estimated by the estimation device;
    a corresponding determination value calculation device configured to determine, every time the acquisition device acquires the sensor output, a value of the cylinder air amount at a point of time earlier, by a transport delay time, than a point of time of the acquisition based on the time-series data and calculate a corresponding determination value corresponding to the value of the determined cylinder air amount; and
    a determination value determination device configured to determine a determination value based on a plurality of the corresponding determination values calculated by the corresponding determination value calculation device.

2. The apparatus for detecting an abnormal air-fuel ratio variation between cylinders according to claim 1, wherein the parameter calculation device calculates an average value of a plurality of the parameters as the parameter.

3. The apparatus for detecting an abnormal air-fuel ratio variation between cylinders according to claim 1, wherein the determination device determines that the abnormal air-fuel ratio variation between cylinders is present when the parameter calculated by the parameter calculation device is not less than the given determination value, and determines that the abnormal air-fuel ratio variation between cylinders is absent when the parameter calculated by the parameter calculation device is less than the given determination value.

4. The apparatus for detecting an abnormal air-fuel ratio variation between cylinders according to claim 1, wherein the transport delay time is a predetermined time equal to an integer multiple of the sampling interval.

5. The apparatus for detecting an abnormal air-fuel ratio variation between cylinders according to claim 4, wherein the transport delay times are predetermined times equal to a plurality of the integer multiple of the sampling interval.

6. The apparatus for detecting an abnormal air-fuel ratio variation between cylinders according to claim 1, wherein the sampling interval has a unit of a crank angle.

7. The apparatus for detecting an abnormal air-fuel ratio variation between cylinders according to claim 1, wherein the transport delay time is a time required for exhaust gas to reach the air-fuel ratio sensor from the cylinder.

8. The apparatus for detecting an abnormal air-fuel ratio variation between cylinders according to claim 1, wherein the corresponding determination value calculation device calculates the corresponding determination value corresponding to the value of the cylinder air amount according to a given map.

9. The apparatus for detecting an abnormal air-fuel ratio variation between cylinders according to claim 1, wherein the determination value determination device determines an average value of the plurality of the corresponding determination values as the determination value.

10. The apparatus for detecting an abnormal air-fuel ratio variation between cylinders according to claim 9, wherein the determination value determination device determines an average value of the plurality of the corresponding determination values in one cycle of the multi-cylinder internal combustion engine as the determination value.

11. The apparatus for detecting an abnormal air-fuel ratio variation between cylinders according to claim 10, wherein the determination value determination device determines an average value of the determination values in a plurality of cycle sections of the multi-cylinder internal combustion engine as the determination value.

12. The apparatus for detecting an abnormal air-fuel ratio variation between cylinders according to claim 1, further comprising:
an intake air amount detection device configured to be provided in an intake passage of the internal combustion engine, the estimation device being configured to estimate the cylinder air amount based on an intake air amount detected by the intake air amount detection device.

13. A method for detecting an abnormal air-fuel ratio variation between cylinders of a multi-cylinder internal combustion engine provided with an air-fuel ratio sensor,
the method comprising:
acquiring an output of the air-fuel ratio sensor at each given sampling interval;
calculating a parameter correlated with a degree of fluctuation of the sensor output from a plurality of the acquired sensor outputs;
estimating a cylinder air amount as an amount of air having flown into a cylinder at each sampling interval;
storing time-series data on the estimated cylinder air amount at each sampling interval;
determining, every time the sensor output is acquired, a value of the cylinder air amount at a point of time earlier, by a transport delay time, than a point of time of the acquisition based on the time-series data and calculating a corresponding determination value corresponding to the value of the determined cylinder air amount;
determining a determination value based on a plurality of the calculated corresponding determination values; and
comparing the calculated parameter with the determination value and determining whether the abnormal air-fuel ratio variation between cylinders is present or absent.

* * * * *